United States Patent [19]

Lundberg et al.

[11] 4,127,546

[45] Nov. 28, 1978

[54] PLASTICIZATION OF NEUTRALIZED SULFONATED ELASTOMERS WITH ROSIN SALTS

[75] Inventors: Robert D. Lundberg, Bridgewater; Robert R. Phillips, Spring Lake Heights; Henry S. Makowski, Scotch Plains; Douglas Brenner, Livingston, all of N.J.

[73] Assignee: Exxon Research & Engineering Company, Florham Park, N.J.

[21] Appl. No.: 855,755

[22] Filed: Nov. 29, 1977

[51] Int. Cl.² ............................................. C08L 93/00
[52] U.S. Cl. ............................... 260/27 BB; 260/27 R; 260/28.5 B; 260/33.6 AQ; 260/42.47; 260/DIG. 31
[58] Field of Search ......... 260/27 BB, 28.5, 33.6 AQ, 260/33.6 PQ, 79.3 R, 42.47, DIG. 31

[56] References Cited

U.S. PATENT DOCUMENTS

| | | | |
|---|---|---|---|
| 3,642,728 | 2/1972 | Canter | 260/79.3 R |
| 3,836,511 | 9/1974 | O'Farrell et al. | 260/79.3 R |
| 3,847,854 | 11/1974 | Canter et al. | 260/23.7 M |
| 3,870,841 | 3/1975 | Makowski et al. | 260/23.7 R |
| 3,932,330 | 1/1976 | Lakshmanan | 260/27 BB |

*Primary Examiner*—Lewis T. Jacobs
*Attorney, Agent, or Firm*—Richard E. Nanfeldt

[57] ABSTRACT

This invention relates to an improved elastomeric composition of metal neutralized sulfonated polymers which are plasticized with a preferential plasticizer at a concentration level of at least 1 part by weight based on 100 parts by weight of the metal neutralized EPDM terpolymer, wherein the preferential plasticizer is a metal rosin salt. The resultant compositions have improved physical properties and can be processed on conventional plastic fabrication equipment.

23 Claims, No Drawings

PLASTICIZATION OF NEUTRALIZED SULFONATED ELASTOMERS WITH ROSIN SALTS

BACKGROUND OF THE INVENTION

1. Field of the Invention

This invention relates to an improved elastomeric composition of metal neutralized sulfonated polymers which are plasticized with a preferential plasticizer at a concentration level of at least 1 part by weight based on 100 parts by weight of the metal neutralized EPDM terpolymer, wherein the preferential plasticizer is a metal rosin salt. The resultant compositions have improved physical properties and can be processed on conventional plastic fabrication equipment.

2. Description of the Prior Art

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728 herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The SO$_3$H groups of the sulfonated elastomer can be readily neutralized with a basic material to form an ionically crosslinked elastomer having substantially improved physical properties over an unsulfonated elastomer at room temperature. However, these ionically crosslinked elastomers, may be processed like conventional thermoplastics at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements. Although these sulfonated elastomeric polymers prepared by the process of this patent are readily useable in a certain number of limited applications, they are not as readily adaptable for the manufacture of an injection moldable elastomeric article such as footwear or garden hose by an extrusion process as are the improved compositions of the present invention, wherein both improved physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically crosslinked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° C. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions formed by this process are not as suitable for the manufacture of high performance elastomeric articles formed by an injection molding process or extrusion process as are the compositions of the present invention.

U.S. Pat. No. 3,847,854, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer.

The concentrations of the non-volatile plasticizers in U.S. Pat. No. 3,847,854 are limited to an upper concentration of 6–7 wt.% because with the metal neutralized sulfonated elastomers of this invention, there would be an adverse plasticization of the polymeric backbone. This invention fails to teach the use of a metal rosin salt as a preferential plasticizer. The inventive concept of the present instant invention clearly teaches the use of metal rosin salts as preferential plasticizers at a minimum concentration level of at least about 1 wt.% in order to achieve some desired physical and rheological properties.

The use of sulfonated ethylene-propylene terpolymers (Sulfo EPDM) as potential candidates for thermoplastic elastomers has been well demonstrated in recent years. One of the important characteristics of Sulfo EPDM materials is that they manifest very high melt viscosities in the absence of any plasticizer. It has been well demonstrated that selective carboxylic acids, such as stearic acid, can have an important influence on the melt viscosities and physical properties of such metal neutralized sulfonated elastomers. Indeed, the employment of such plasticizers makes the flow behavior of these sulfonated elastomers acceptable for extrusion and injection molding when practiced with the appropriate type and level of plasticizers in both Sulfo EPDM gums and in suitable compounds.

Despite the fact that Sulfo EPDM systems can be employed in thermoplastic elastomer systems by using the plasticizers known in the art, there is need for additives which would give better physical properties and flow behavior, especially in Sulfo EPDM based compounds. Typically, the plasticizers that are used with Sulfo EPDM systems are those which soften at elevated temperatures in the appropriate compounds and gums to enhance the flow of such systems, but which when cooled will resolidify, thereby providing good physical properties at ambient conditions. Among the various plasticizers which have been described in the prior art (for example, see U.S. Pat. No. 3,847,854) are the following: organic acid salts such as calcium stearate, zinc laurate, zinc stearate, magnesium laurate, stearic acid, lauric acid, and so forth. The use of such materials as described above permits a reasonable flow of the Sulfo EPDM gums and compounds, but depending on the particular plasticizer employed and its level, there are often associated deficiencies with the specific plasticizers employed heretofore. In particular, the fact that these plasticizers are solids at room temperature or somewhat above, provides compounds and gums which display higher hardnesses than do the gums in the absence of the plasticizer. Often this can be an advantage; in other cases it can be a disadvantage if one is looking for elastomeric, very flexible gums and compounds. Another disadvantage associated with those plasticizers described in the prior art are that at elevated temperatures above the softening point of the plasticizer, the strength of the gum or compound is rapidly dissipated at mildly elevated temperatures. For example, while a tensile strength of 4000 psi is achievable in a Sulfo EPDM gum using a zinc stearate plasticizer at room temperature, it is found that the tensile strength at 70° C. is lower. Indeed, at temperatures of 100° C., there is little strength associated with Sulfo EPDM gum and the zinc stearate type plasticizer. In the case of plasticizers such as stearic acid, the problem of low tensile strength at elevated temperatures is even further exacerbated with tensile strengths of only 50–60 psi being achieved at temperatures of 70° C. These values vary substantially depending on the particular formulation under study.

This application describes a new class of plasticizers, metal rosin salts, which is applicable in general to gums and compounds of neutralized sulfonated elastomers and plastics. This includes Sulfo EPDM, sulfonated polyethylene, sulfonated polystyrene, sulfonated poly-t-butyl styrene, sulfonated polybutadiene, sulfonated polyisoprene, sulfonated styrene-butadiene rubber and other polymeric materials containing olefinic or aromatic unsaturation sites which are capable of sulfonation.

SUMMARY OF THE INVENTION

The present invention relates to improved compositions of metal neutralized sulfonated polymers being preferentially plasticized with at least about 1 to about 50 parts by weight of a metal rosin salt based on 100 parts by weight of the metal neutralized polymer, more preferably about 3 to about 30 and most preferably about 5 to about 20. These improved compositions have a different balance of physical and rheological properties previously not taught by the prior art.

The elastomeric or thermoplastic compositions of a metal neutralized sulfonated elastomer or thermoplastic plasticized with a metal rosin salt possess a viscosity at 0.73 sec$^{-1}$ at 200° C. of less than about 6 × 10$^5$ poises.

The compositions of the present invention when practiced according to these teachings are readily processed on conventional plastic fabrication equipment into high performance elastomeric or polymeric articles such as garden hose, elastomeric footwear such as sneakers, unit soles, sporting goods, wire insulation, or automotive hose.

Accordingly, it is one object of our present instant invention to provide unique and novel compositions of a metal neutralized sulfonated EPDM being preferentially plasticized with the metal rosin salts, thereby providing high performance elastomeric articles which can be formed on conventional plastic fabricating equipment, wherein improved high temperature physical properties are obtained, and wherein the hardness of the elastomeric article is not substantially adversely affected by the use of a preferential plasticizer.

Specifically, it is often observed that the thermoplastic elastomers of the prior art usually possess poor physical properties at high temperatures, especially with softer compositions (Shore A Hardness of 50 to 80). Thus, such systems do not combine soft rubbery characteristics at ambient temperature while maintaining good tensile properties at elevated temperatures. The instant invention teaches a class of preferential plasticizers which can provide soft rubbery compositions at ambient temperatures while maintaining unexpectedly good properties at temperatures of 100° C. and above, while still retaining good processability at more elevated temperatures. This combination of properties and melt flow is very desirable in a number of practical applications, such as, for example automotive applications such as extruded hose.

The metal neutralized sulfonated polymers of this present instant invention are derived from either thermoplastic or elastomeric polymers having either olefinic or aromatic unsaturation sites. In particular, unsaturated elastomeric polymers of this invention include low unsaturated polymers such as Butyl rubber and EPDM, and high unsaturation polymers such as polybutadiene and polyisoprene. In addition to these elastomers, suitable sulfonic acid containing polymers may be prepared from plastic polymers prepared by the polymerization of ethylene or propylene with multiolefins such as 1,4-hexadiene, dicyclopentadiene, norbornadiene, 5-methylene-2-norbornene, 5-ethylidene-2-norbornene, 5-propenyl-2-norbornene, 1,5-cyclooctadiene, etc. Preferably these polymers have incorporated therein about 0.2 to about 10 mole% unsaturation; more preferably about 0.5 to 6%; most preferably about 1 to about 4%, e.g. 2%. Illustrative of these plastic like polymers is a product containing about 90 mole% ethylene, about 6 mole% propylene, and about 4 mole% of diene monomer. The high ethylene content of these systems provides a more plastic-like material than the EPDM rubbers discussed below. The preferred polymers of this invention are based on EPDM.

Though the term "olefinic unsaturation" does not include aromatic unsaturation, the polymer backbone may contain aromatic rings either within the backbone structure or pendant therefrom. Sulfonation, however, is preferentially carried out at the site of olefinic unsaturation rather than on the aromatic ring.

The term "EPDM" is used in the sense of its definition as found in ASTM D-1418-64 and is intended to mean a terpolymer containing ethylene and propylene in the backbone and unsaturation in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 45 to about 80 wt.% ethylene and about 2 to about 10 wt.% of a diene monomer, the balance of the polymer being propylene. Preferably, the polymer contains about 50 to about 60 wt.% ethylene, e.g. 56 wt.% and about 2.6 to about 4.0 wt.% diene monomer, e.g. 3.3 wt.%. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene. A typical EPDM is Vistalon 2504 (Exxon Chemical Co.) a terpolymer having a Mooney viscosity (ML, 1 + 8, 212° F.) of about 40 and having an ethylene content of about 40 wt.% and a 5-ethylidene-2-norbornene content of about 5.0 wt.%. The $\overline{M}n$ of Vistalon 2504 is about 47,000, the $\overline{M}v$ is about 145,000 and the $\overline{M}w$ is about 174,000.

An EPDM terpolymer Vistalon 2504-20 is derived from Vistalon 2504 by a controlled extrusion process, wherein the resultant Mooney viscosity at 212° F. is about 20. The $\overline{M}n$ of Vistalon 2504-20 is about 26,000, the $\overline{M}v$ is about 90,000 and the $\overline{M}w$ is about 125,000.

The EPDM terpolymers of this invention have a number average molecular weight ($\overline{M}n$) of about 10,000 to about 200,000, more preferably of about 15,000 to about 100,000, most preferably of about 20,000 to about 60,000. The Mooney viscosity (ML, 1 + 8, 212° F.) of the EPDM terpolymer is about 5 to about 60, more preferably about 10 to about 50, and most preferably about 15 to about 40. The $\overline{M}v$ of the EPDM terpolymer is preferably below about 350,000 and more preferably below about 300,000. The $\overline{M}w$ of the EPDM terpolymer is preferably below about 500,000 and more preferably below about 350,000.

Typical representative examples of thermoplastic polymers useful in the instant invention include sulfonated polystyrene, sulfonated poly-tertiary butylstyrene, or sulfonated poly-α-methylstyrene. Preferably, the thermoplastic to be sulfonated will be polystyrene.

In carrying out the invention, the elastomeric or thermoplastic polymer is dissolved in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −10° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorus. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for the invention is an acyl sulfate selected from the group consisting essentially of benzoyl, acetyl, propionyl or butyryl sulfate. The acyl sulfate can be formed in situ in the reaction medium in a chlorinated aliphatic or aromatic hydrocarbon.

It should be pointed out that neither the sulfonating agent nor the manner of sulfonation is critical, provided that the sulfonating method does not degrade the polymeric backbone. The reaction is quenched with an aliphatic alcohol such as methanol, ethanol, isopropanol, with an aromatic hydroxyl compound, such as phenol, a cycloaliphatic alcohol such as a cyclohexanol, or with water. The acid form of the sulfonated elastomeric polymer has about 10 to about 100 meq. $SO_3H$ groups per 100 grams of sulfonated polymer, more preferably about 15 to about 50; and most preferably about 20 to about 40. The meq. of $SO_3H/100$ grams of polymer is determined by both titration of the polymeric sulfonic acid and Dietert Sulfur analysis. In the titration of the sulfonic acid the polymer is dissolved in solvent consisting of 95 parts of toluene and 5 parts of methanol at a concentration level of 50 grams per liter of solvent. The acid form is titrated with ethanolic sodium hydroxide to an Alizarin Thymolphthalein endpoint.

The acid form of the sulfonated polymer is gel free and hydrolytically stable. Gel is measured for Sulfo EPDM by stirring a given weight of said polymer in a solvent comprised of 95 toluene-5-methanol at a concentration of 5 wt.%, for 24 hours, allowing the mixture to settle, withdrawing a weighed sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

Neutralization of the acid form of the sulfonated polymer is done by the addition of a solution of metal acetate to the acid form of the sulfonated elastomeric or thermoplastic polymer dissolved in the mixture of the aliphatic alcohol and non-reactive solvent. The metal acetate is dissolved in a binary solvent system consisting of water and/or an aliphatic alcohol. Typically, but non-limiting metal acetates are sodium acetate, barium acetate, magnesium acetate, aluminum acetate, potassium acetate, lead acetate, and zinc acetate, wherein zinc acetate is preferred.

Sufficient metal acetate is added to the solution of the acid form of the elastomeric polymer to effect neutralization of the $SO_3H$ groups. It is preferable to neutralize at least 95% of the acid groups, more preferably about 98%, most preferably 100%.

The resultant metal neutralized sulfonated terpolymer has a viscosity at 0.73 $sec^{-1}$ at 200° C. of about $5 \times 10^4$ poises to about $5 \times 10^6$ poises, more preferably of about $5 \times 10^4$ poises to about $2 \times 10^6$ poises, and most preferably about $1 \times 10^5$ poises to about $1 \times 10^6$ poises.

A means of characterizing the apparent molecular weight of a polymer involves the use of melt rheological measurements. For ionic polymers, this is the preferred method since solution techniques are difficult to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this invention, the relationship will be assumed to be one of direct proportionality. Thus, in comparing two materials, the one with the higher melt viscosity will be associated with the higher apparent molecular weight.

The melt viscosity of the systems investigated were determined by the use of an Instron Capillary Rheometer. Generally, the melt viscosity measurements were made at a temperature of 200° C. and at various shear rates corresponding to crosshead speeds from 0.005 in/min to 20 in/min. The apparent viscosity at 200° C. and at a shear rate of 0.73 $sec^{-1}$ (0.005 in/min) is employed as a characterization parameter in this invention. A measure of melt elasticity of a given system can also be obtained from these rheological measurements. A type of flow instability known as melt fracture is exhibited by many polymeric materials of high molecular weight. This phenomenon is shear sensitive and thus will generally exhibit itself at a given shear rate and temperature. The shear rate for the onset of melt fracture indicates the upper shear rate for processing a given material. This is used as a characterization parameter for compositions employed in extrusion processing. The metal sulfonate containing polymers at the higher sulfonate levels possess extremely high melt viscosities and are thereby difficult to process.

The rosin salts are a class of materials which are based on divalent or monovalent metals. A preferred divalent metal is zinc. Other metals can be employed and includes those in Groups IA, IB, IIA and IIB of the Periodic Table. There are a number of such salts available commercially and they are known as Pexate 511, which is available from Hercules, Inc., Zirex, Zinar, Zitro and Hifos 138, available from Reichold Chemicals. The rosin structures that are employed to make these rosin salts are normally illustrated as having a perhydrophenathrene skeleton with at least one carboxylate group attached (acids, such as abietic acid). Also the known hydrogenated and disproportionated derivatives of ordinary rosins can be employed to prepare these rosin salts. The rosin salts normally have softening points ranging from about 110° C. up to 190° C. or so, and appear to be glassy type products. These systems have been described previously in the patent literature as being suitable neutralization agents for EPDM polymers grafted with maleic anhydride. This is disclosed in U.S. Pat. No. 3,997,487, which is hereby incorporated by reference.

There is an important distinction of the rosin salt plasticizers of this invention over previously employed plasticizers for these sulfonated polymers. Those important distinctions have already been related, but they will be clarified in the following examples. Some of the examples employed have utilized Zirex as a preferred form of the rosin salt. Zirex is a zinc-based rosin salt which has a softening point of around 130° C. The zinc rosin salts employed herein are observed to be compatible with sulfonated EPDM over a range of from less than 5 wt.% to greater than 20 wt.%.

The metal rosin salt is incorporated into the metal neutralized sulfonated elastomeric or thermoplastic polymer at a concentration level of about 1 to about 50 parts by weight based on 100 parts of metal neutralized sulfonated polymer, more preferably about 3 to about 30 and most preferably about 5 to about 20.

Over this range (1 to >20 phr) it is observed that the rosin salt appears to be "compatible" with the sulfonated neutralized EPDM that has been employed. By compatible, it is meant that no obvious exudation occurs when the rosin salt and polymer are mixed. The presence of the zinc rosin salt is observed to improve dramatically the flow behavior at elevated temperatures of the neutralized sulfonated elastomer while simultaneously improving the room temperature tensile properties of said elastomer. Surprisingly it has been observed that these room temperature properties are improved without significant increase in the modulus at low strain rates. In other words, the 100% modulus of a sulfonated EPDM containing 10-20 percent of the zinc rosin salt is almost within experimental error of the starting unplasticized sulfonated gum. This is in apparent contrast with the behavior of the prior plasticizers employed with sulfonated EPDM systems, as will be apparent in the examples.

The crumb of the metal neutralized sulfonated polymer can be blended with the metal rosin salt by techniques well known in the art. For example, the blend composition can be compounded on a two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings may be obtained through the use of a Farrel Continuous Mixer, a twin screw extruder, or tandem extrusion techniques which are continuous mixing type equipment. The Banbury mixing device is the preferred batch type mixer, and the twin screw extruder is the preferred continuous mixer.

Additionally, fillers, oils, waxes, thermoplastic resins, reinforcing agents and other chemical and physical modifying agents can be incorporated into the blend of the metal neutralized sulfonated polymer and metal rosin salt for further modulation of the chemical and physical properties of the blend composition of the instant invention.

The fillers employed in the present invention are selected from talcs, ground calcium carbonate, water precipitated calcium carbonate, or delaminated, calcined or hydrated clays and mixtures thereof. These fillers are incorporated into the blend composition at about 25 to about 350 parts per hundred, more preferably at about 50 to about 350; and most preferably at about 50 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE I

| Filler | Code # | Oil Absorption grams of oil/ 100 grams of filler | Specific Gravity | Avg. Particle Size, Microns | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Suprex | — | 2.6 | 2 | 4.0 |
| Calcined clay | Icecap K | 50–55 | 2.63 | 1 | 5.0–6.0 |
| Magnesium silicate (Talc) | Mistron Vapor | 60–70 | 2.75 | 2 | 9.0–9.5 |
| Calcium silicate | — | 120 | 2.1 | .03 | 10.0 |

The oils employed in the present invention are non-polar process oils having less than about 2 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 s.s.u.'s at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of about 25 to about 200 parts per hundred; more preferably at about 25 to about 150, and most preferably at about 50 to about 150.

TABLE II

| Type Oil | Oil Code # | Viscosity ssu | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

Various other chemical additives can be incorporated into the blend compositions to improve the physical properties, the appearance, the chemical properties of the formed elastomeric article or to modify the processability of the blend compositions.

A crystalline polyolefinic thermoplastic can be incorporated into the blend composition in minor proportions as a means for modification of the rheological properties of the blend compositions as well as the stiffness of the elastomeric article. Typically, the crystalline polyolefinic thermoplastic is added to the blend composition at a concentration level of about 0 to about 100 parts per hundred by weight based on 100 parts of sulfonated polymer, more preferably at about 0 to about 75; and most preferably at about 0 to about 50.

The crystalline polyolefin is characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha-olefins. Most preferably the polyolefins are selected from the group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. For example, polyethylenes having a density from 0.90 to 0.97 gms/cc. are generally included. Polypropylene polymers having intermediate and high densities are the preferred examples of the polypropylene materials useful in the instant invention. These materials will have a density from 0.88 to 0.925 gms./cc. The polyethylene or polypropylene can also be combined as copolymers thereof so long as adequate crystallinity is obtained in said combination.

Zinc oxide can be incorporated into the blend as a whitening pigment. The zinc oxide is incorporated into the blend composition at a concentration level of about 0 to about 25 parts per hundred by weight based on 100 parts of sulfonated polymer, more preferably about 0 to about 15. Alternatively, a Rutile or Anatase titanium dioxide can be employed as a whitening pigment.

A lubricant can be employed in the blend composition at a concentration level of about 0 to about 20 parts per hundred by weight based on 100 parts of the neutralized sulfonated elastomeric polymers and more preferably about 0 to about 15. The lubricants of the present instant invention are non-polar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 2 wt. % polar constituents. These lubricants modify the rheological properties of the composition, improve the processability in forming the elastomeric article and impart a shine or gloss to the elastomeric article. Additionally, amorphous polypropylene can be used as a lubricant.

Additionally, reinforcing fillers can be added as an additive to the blends of sulfonated polymer, filler and oil, wherein the reinforcing filler is selected from the group consisting essentially of silica, carbon black, or calcium silicate and mixtures therein. These reinforcing fillers are generally characterized as having particle sizes below 0.1 microns and are incorporated in the blend composition at about 0 to 50 parts per hundred based on 100 parts of sulfonated polymer, more preferably 0 to 25. The ratio of filler to reinforcing filler is at least about 1, more preferably about 2, most preferably about 3.

The rosin salts of this invention can be based on a number of different cations. The selection of the preferred rosin salt for a given metal sulfonate system depends to some extent on the desired balance of processability and physical properties which is desired in the final composition. For example, it is found that the use of the zinc rosin salt with a zinc sulfo EPDM provides a system with good processability and adequate high temperature (100° C.) properties. If a rosin salt containing a substantial level of calcium is employed, it is observed that at higher rosin salt levels, the melt flow rate can actually decrease, while the high temperature properties are correspondingly improved. Therefore a suitable combination of melt flow and physical properties can be attained by the selection of the particular rosin salt, its concentration and the metal sulfonate EPDM.

The preferred rosin salts are those based on zinc and calcium salts. The most preferred systems are those based on a rosin salt containing greater than 95% zinc salt and employing the zinc sulfonated EPDM.

DETAILED DESCRIPTION

The advantages of both the rheological and physical properties of the blend compositions of the present invention can be more readily appreciated by reference to the following examples and tables.

EXAMPLE 1

In 5000 ml of hexane 500 g of EPDM containing about 50 weight % ethylene and about 5 weight % 5-ethylidene-2-norbornene and having a Mooney Viscosity (ML, 1+8, 212° F.) of about 20 was dissolved and 304 mmoles of acetic anhydride was added followed by 187.5 mmoles of concentrated sulfuric acid.

After 30 minutes of reaction at room temperature the sulfonation was quenched with 500 ml of methanol. Then the sulfonated cement was neutralized with a solution of zinc acetate corresponding to 60 milliequivalents of zinc acetate per 100 g of polymer (or 0.15 moles) in 125 ml of water. Antioxidant 2246 (2.5 g) was added and the cement stirred for 30 minutes. The acid form of the sulfonated EPDM contained 33.3 meq SO$_3$H groups/100 gms. EPDM. The cement was steam stripped to isolate a polymer crumb which was subsequently dried. The sample was designated NPG 60/0.

EXAMPLE 2

The procedure of Example 1 was followed except that 120 milliequivalents of zinc acetate per 100 gms of polymer was added to neutralize the polymer and, in addition, 30 milliequivalents of stearic acid per 100 g EPDM was also added after the zinc acetate. The cement was worked up in the same manner and the sample was designated as 120/30. In this sample, zinc stearate is created and retained as an efficient plasticizer and estimated to be present at a level of about 8 wt. %.

EXAMPLES 3-6

Plasticization of Zinc Acetate Neutralized Sulfonated EPDM with Zirex

Three blends were prepared in a Brabender mixer from the Sulfo EPDM polymer of Example 1, and 5, 10 and 20% Zirex (zinc resinate, Reichold Chemical Co., Newport Div. Sp. gr. 1.162, m.p. 130°–135° C.) at a mixing head temperature of 150° C. Temperature during mixing (5 min.) rose to 150°–158° C. The resultant blends were sheeted on a 3-inch electrically heated mill at 160° C.

Melt index (190° C., 250 psi) and rheological measurements (200° C.) were obtained on 2-inch × 6-inch × 60 mil compression molded pads (pressed at 350° F., 4 min.). Stress-strain data were obtained on micro dumbbells cut from 20 mil micro pads (same press conditions) at room temperature, 70° C., and 100° C. Similar property tests were obtained on the starting unplasticized gum of Example 1 and the plasticized 120/30 sulfonated EPDM gum of Example 2. Data are given in Tables III, IV, V, VI and VII.

The zinc resinate imparted a somewhat amber color to the pressed pads. The clarity of the pads suggested that in this range of incorporation (5-20%) the zinc resinate is compatible with the sulfonated EPDM.

Melt index measurements (Table III) showed the melt viscosity of the plasticized blends were markedly improved with increasing Zirex content.

Capillary rheology studies were done on Examples 3-6 with the results shown in Table IV. These results are comparable to the observations recorded in Table III. It is clearly evident that the incorporation of Zirex markedly lowers the shear stress at 200° C. over that of the control (no plasticizer). At a level of 20% Zirex the shear stress values are lower than observed for the 120/30 system which is estimated to have about 8% zinc stearate present (Example 6).

Improved room temperature tensile strength over that for the 120/30 gum is achieved with the addition of 10 and 20% Zirex to the unplasticized control gum (Table V). At 70° C., tensile strength of the 20% Zirex blend is comparable to the 120/30 gum (Table VI), while at 100° C., all three rosin salt plasticized gums (5, 10, 20%) maintain tensile strength substantially above that for the 120/30 gum (Table VII).

Based on these results it is concluded that Zirex (zinc resinate) is compatible with a 60/0 sulfonated EPDM over the 5-20% range employed and is seen to be applicable as a plasticizer for these systems. Melt viscosity, softening range and melt rheology comparable to a 120/30 neutralized sulfonated EPDM can be achieved with a 20% Zirex-NPG blend while at the same time achieving higher room temperature tensiles and maintaining tensile strength at 100° C. substantially above that for the 120/30 neutralized sulfonated EPDM.

TABLE III

| Sample | Gum | M.I. (g/10 min.) (190° C. 250 psi) |
|---|---|---|
| Example 3 | 60/0 NPG + 5% Zirex | 0.10 |
| Example 4 | 60/0 NPG + 10% Zirex | 0.29 |
| Example 5 | 60/0 NPG + 20% Zirex | 0.47 |
| Example 6 | 120/30 (zinc stearate) | 0.55 |

TABLE IV

Melt Rheological Measurements of Examples 3-6

(Temperature 200° C.)
(Capillary 0.0505"D × 1.0068"L)

| Sample | Shear Stress at Various Shear Rates, (Dynes/cm$^2$ × 10$^{-5}$) | | | | |
|---|---|---|---|---|---|
| | 0.73 Sec$^{-1}$ | 7.3 Sec$^{-1}$ | 73 Sec$^{-1}$ | 291 Sec$^{-1}$ | 728 Sec$^{-1}$ |
| Control (No plasticizer) | 30.7 | 54.6 | 74.4 | 91.6 | 105.7 |
| Example 3 (60/0+5% Zirex) | 13.1 | 30.0 | 65.0 | 83.0 | 97.9 |
| Example 4 (60/0+10% Zirex) | 7.7 | 19.7 | 44.6 | 70.9 | 86.2 |
| Example 5 (60/0+20% Zirex) | 4.9 | 14.1 | 32.0 | 48.6 | 64.2 |
| Example 6 (120/30, About 8% Zinc Stearate estimated) | 5.4 | 16.6 | 39.6 | 59.8 | 75.3 |

TABLE V

STRESS-STRAIN DATA AT ROOM TEMPERATURE

| Sample | Gum | Stress Values at Various Strains, (psi) | | | | | |
|---|---|---|---|---|---|---|---|
| | | 100% | 200% | 300% | 400% | Tensile | Elong. % |
| Control | 60% NPG | 343 | 552 | 845 | — | 1077 | 350 |
| Example 3 | NPG + 5% Zirex | 330 | 566 | 897 | 1504 | 2305 | 465 |
| Example 4 | NPG + 10% Zirex | 341 | 601 | 1026 | 1859 | 3334 | 470 |
| Example 5 | NPG + 20% Zirex | 360 | 627 | 1110 | 2063 | 4129 | 485 |
| Example 6 | 120/30 | 468 | 754 | 1157 | 1935 | 2660 | 453 |

TABLE VI

STRESS-STRAIN DATA AT 70° C.

| Sample | Gum | Stress Values at Various Strains, (psi) | | | | | Tensile | Elong. % |
| --- | --- | --- | --- | --- | --- | --- | --- | --- |
| | | 100% | 200% | 300% | 400% | 500% | | |
| Control | 60% NPG | 235 | — | — | — | — | 269 | 138 |
| Example 3 | NPG + 5% Zirex | 190 | 259 | 353 | — | — | 418 | 350 |
| Example 4 | NPG + 10% Zirex | 151 | 203 | 278 | 388 | — | 433 | 435 |
| Example 5 | NPG + 20% Zirex | 152 | 211 | 303 | 437 | 605 | 713 | 543 |
| Example 6 | 120/30 | 254 | 330 | 437 | 584 | 811 | 727 | 475 |

TABLE VII

STRESS-STRAIN DATA AT 100° C

| Sample | Gum | Stress Values at Various Strains, (psi) | | | | | | | | | | Tensile | Elong, % |
| --- | --- | --- | --- | --- | --- | --- | --- | --- | --- | --- | --- | --- | --- |
| | | 100% | 200% | 300% | 400% | 500% | 600% | 700% | 800% | 900% | 1000% | | |
| Control | 6% NPG | 183 | — | — | — | — | — | — | — | — | — | 197 | 128 |
| Example 3 | NPG + 5% Zirex | 128 | 155 | 195 | 247 | — | , | — | — | — | — | 280 | 450 |
| Example 4 | NPG + 10% Zirex | 91 | 109 | 129 | 155 | 191 | 232 | — | — | — | — | 242 | 620 |
| Example 5 | NPG + 20% Zirex | 80 | 98 | 118 | 145 | 181 | 226 | — | — | — | — | 253 | 657 |
| Example 6 | 120/30 | 61 | 53 | 49 | 48 | 49 | 49 | 52 | 54 | 65 | 69 | (70)* | (1680+)* |

*at limits of test machine

EXAMPLES 7-19

Plasticization of Zinc Acetate Neutralized Sulfonated 50% $C_2$ EPDM with Metal Rosin Salts The following series of Examples extends the investigation of metal rosin salts as plasticizers for sulfonated polymers to metal rosin salts varying in zinc and calcium content and to sulfonates varying in the type of EPDM employed.

Table VIII lists those metal rosin salts employed and shows therein zinc and calcium content, ratio of Zn to Ca and softening range.

Blends were prepared with a Brabender mixer of the polymer of Example 1 with levels of 5, 10 and 20% Zirex, Zitro, Zinar and HiFos rosin salts. Mix temperatures required to achieve blending were 155° C. (Zirex), 160° C. (Zitro) 170° C. (Zinar), and 190° C. (HiFos). The resulting blends were sheeted on a 3 inch electrically heated mill at approximately the same temperature as required for blending of each rosin salt.

Melt index measurements and stress strain data were obtained as described above. Similar property tests were obtained on the starting sulfonate gum and with the polymer of Example 2 for property comparisons.

Property measurements obtained are summarized in Table IX. Analysis of the data of Table IX shows some variation in the physical properties obtained from various samples plasticized with different rosin salts. In general those samples derived from Zirex rosin salt exhibit improved physical properties over all the temperatures tested.

TABLE VIII

ZINC AND CALCIUM CONTENT AND SOFTENING RANGE OF METAL ROSIN SALTS

| Metal Rosin Salt | % Zn | % Ca | Zn/Ca | Softening Range |
| --- | --- | --- | --- | --- |
| Zirex | 4.35 | 0.30 | 14.5/1 | 130–135° C |
| Zitro | 3.6 | 1.61 | 2.2/1 | 130–135° C |
| Zinar | 4.25 | 1.59 | 2.7/1 | 160° C |
| HiFos | 0.029 | 2.66 | 1/92 | — |

TABLE IX
STRESS-STRAIN AND MELT INDEX PROPERTIES OF ZIREX, ZITRO, ZINAR AND HiFos BLENDS OF SULFONATED 50% C₂ EPDM, 60 MEQ. ZINC ACETATE NEUTRALIZED

| Ex. | Resinate | % Resinate | Melt Index g/10 min 190°C 250 psi | Room Temperature 100% Mod. | 300% Mod. | Tensile | Elong | 70°C 100% Mod. | 300% Mod. | Tensile | Elong | 100°C 100% Mod. | 300% Mod. | Tensile | Elong | 121°C 100% Mod. | 300% Mod. | Tensile | Elong |
|---|---|---|---|---|---|---|---|---|---|---|---|---|---|---|---|---|---|---|---|
| NPG | Control | — | 0.007 | 343 | 845 | 1077 | 350 | 235 | — | 269 | 138 | 183 | — | 197 | 128 | 210 | — | 311 | 240 |
| 7 | Zirex | 5 | 0.1 | 330 | 897 | 2305 | 465 | 190 | 353 | 418 | 350 | 128 | 195 | 280 | 450 | 105 | 139 | 196 | 617 |
| 8 | " | 10 | 0.29 | 341 | 1026 | 3334 | 470 | 151 | 278 | 433 | 350 | 91 | 129 | 242 | 620 | 75 | 86 | 89 | 937 |
| 9 | " | 20 | 0.47 | 360 | 1110 | 4129 | 485 | 152 | 303 | 713 | 543 | 80 | 118 | 253 | 657 | 71 | 98 | 179 | 937 |
| 10 | Zitro | 5 | 0.17 | 210 | 484 | 1307 | 433 | 125 | 177 | 198 | 353 | 73 | 68 | 86 | 460 | — | — | — | — |
| 11 | " | 10 | 0.39 | 195 | 415 | 1372 | 447 | 103 | 135 | 163 | 397 | 55 | 48 | 67 | 547 | — | — | — | — |
| 12 | " | 20 | 0.63 | 211 | 474 | 1982 | 485 | 86 | 138 | 145 | 363 | 47 | 56 | 75 | 437 | — | — | — | — |
| 13 | Zinar | 5 | 0.17 | 213 | 479 | 1643 | 465 | 122 | 171 | 196 | 357 | 69 | 64 | 78 | 450 | — | — | — | — |
| 14 | " | 10 | 0.36 | 192 | 397 | 1190 | 433 | 103 | 137 | 160 | 370 | 52 | 48 | 61 | 470 | — | — | — | — |
| 15 | " | 20 | 0.62 | 187 | 421 | 2058 | 487 | 88 | 139 | 158 | 350 | 65 | 114 | 152 | 413 | — | — | — | — |
| 16 | HiFos | 5 | 0.11 | 200 | 466 | 1588 | 473 | 124 | 188 | 239 | 400 | 81 | 98 | 125 | 423 | — | — | — | — |
| 17 | " | 10 | 0.24 | 201 | 409 | 1356 | 450 | 107 | 157 | 196 | 385 | 70 | 92 | 134 | 477 | — | — | — | — |
| 18 | " | 20 | 0.29 | 188 | 436 | 1786 | 480 | 99 | 153 | 190 | 377 | 76 | 123 | 180 | 440 | — | — | — | — |
| 19 | *120/30 | — | 0.55 | 468 | 1157 | 2660 | 453 | 254 | 437 | 727 | 475 | 61 | 49 | 70 | 1080+ | 34 | 22 | 9 | 1000 |

*Sulfonate Control, 120 meq. Zinc Acetate, 30 meq. Stearic Acid neutralized.

EXAMPLES 20-32

Plasticization of Zinc Acetate Neutralized Sulfonated 56% C₂ EPDM with Rosin Salts Using the same procedure, rosin salts and percentage levels as described above, blends were prepared of a 60 meq. zinc acetate neutralized sulfonated EPDM (an EPDM containing about 56 wt. % ethylene and about 5 wt. % of 5-ethylidene-2-norbornene and having a Mooney viscosity (ML, 1 + 8, 212° F.) of about 20). Mix and mill temperatures required for these blends were 180° C. (Zirex), 200° C. (Zitro), 190° C. (Zinar) and 205° C. (HiFos).

The starting EPDM employed in this study was derived from a different catalyst system and possessed a different ethylene content from the EPDM employed in Example 1. Therefore the physical properties obtained from the sulfonated products which are shown in Table X and subsequent tables are different from those obtained with the 50% ethylene EPDM feedstock.

Sample specimens were prepared in a similar manner to those of Examples 3-6 and melt index and stress-strain obtained. Control samples for comparison were the starting sulfonate gum and a 120 meq. zinc acetate/30 meq. stearic acid neutralized sulfonated 56% C₂ EPDM.

Property measurements obtained are summarized in Table X.

Analysis of these data clearly demonstrates that as the calcium level in the rosin salt increases, the effectiveness of the plasticizer at improving the flow of the Sulfo EPDM is decreased. In fact, with HiFos, at the higher rosin salt level, the flow of the plasticized gums was nil. It is believed that this is due, in part, to an exchange of the plasticizer cation with the sulfo-EPDM cation, thereby creating a tougher ionomer. The data in Table X appear somewhat consistent with this hypothesis.

cedures outlined above. The physical properties and rheological measurements obtained on the resulting products are presented in Table XII.

Based on the information in Table XII the following conclusion can be reached.

(1) Shore A Hardness is lower with the "Zirex"-based compounds than with the comparable zinc stearate based compounds, and with increasing plasticizer level this difference becomes more apparent.

(2) Melt viscosity at 200° C. in the Instron Capillary Rheometer shows a lower viscosity for the zinc stearate compounds when compared to the resinate at the same levels. Therefore, with the same weight % plasticizer, zinc stearate is more effective in improving melt flow.

(3) Tensile strength moduli values and at room temperature and 70° C. are somewhat higher for zinc stearate-based compounds than for the resinate systems. A substantial difference is prevalent in tensile strength at 100° C., where the zinc resinate based compounds now exhibit relatively high strength as compared to little or no strength for zinc stearate based compounds. Increasing the zinc stearate level to 20 phr results in a further decrease in 100° C. hot tensiles for that system.

These findings in formulations based on rosin salts are significant for they suggest that such plasticizers can function to provide a different set of physical properties as a function of temperature than metal stearate plasticizers. The reasons for this difference in behavior are not completely clear.

TABLE XI

FORMULATIONS BASED ON SULFO EPDM 60/0 NPG WITH ZINC STEARATE AND "ZIREX" AS PLASTICIZERS

| Ingredient | Ex. 33 | Ex. 34 | Ex. 35 | Ex. 36 |
|---|---|---|---|---|
| Sulfo EPDM/60/0 NPG | 100 | | | |
| S-2280 Oil (phr) | 63 | | | |
| Purecal U (phr) | 67 | | | |
| Icekap K (phr) | 48 | | | |
| ZnO (phr) | 5 | | | |
| F-3504 Wax (phr) | 10 | | | |
| Irganox 1010 (phr) | | 0.5 | | |
| ZnSt₂ (phr) | 10 | 20 | | |
| Zirex (phr) | | | 10 | 20 |
| Compound Gravity | 1.23 | 1.22 | 1.23 | 1.23 |
| Mixing Temp. at Start ° C. | 150 | 150 | 150 | 150 |

TABLE X

STRESS-STRAIN AND MELT INDEX PROPERTIES OF ZIREX, ZITRO, ZINAR AND HiFos BLENDS OF SULFONATED 56% C₂EPDM, 60 MEQ. ZINC ACETATE NEUTRALIZED

| | | | Melt Index | Stress-Strain | | | | | | | | | | | |
|---|---|---|---|---|---|---|---|---|---|---|---|---|---|---|---|
| | | 9. | g/10 min | Room Temperature | | | | 70° C | | | | 100° C | | | |
| Ex. | Resinate | Res-inate | 190° C 250 psi | 100% Mod. | 300% Mod. | Tensile | Elong | 100% Mod. | 300% Mod. | Tensile | Elong | 100% Mod. | 300% Mod. | Tensile | Elong |
| NPG | — | — | — | 306 | 953 | 3513 | 500 | 292 | 648 | 812 | 375 | 248 | 504 | 529 | 309 |
| 20 | Zirex | 5 | 0.0087 | 341 | 1279 | 4148 | 463 | 256 | 580 | 689 | 363 | 202 | 375 | 440 | 397 |
| 21 | " | 10 | 0.069 | 307 | 1064 | 5269 | 475 | 210 | 420 | 546 | 410 | 144 | 232 | 292 | 490 |
| 22 | " | 20 | 0.26 | 274 | 916 | 8242 | 510 | 136 | 225 | 411 | 525 | 108 | 155 | 237 | 547 |
| 23 | Zitro | 5 | 0.010 | 356 | 1234 | 6052 | 508 | 232 | 526 | 562 | 325 | 265 | 516 | 568 | 367 |
| 24 | " | 10 | 0.038 | 318 | 990 | 6282 | 480 | 194 | 393 | 515 | 387 | 164 | 305 | 388 | 400 |
| 25 | " | 20 | 0.039 | 301 | 944 | 6565 | 515 | 211 | 501 | 645 | 370 | 196 | 439 | 492 | 337 |
| 26 | Zinar | 5 | 0.011 | 409 | 1523 | 3706 | 443 | 360 | — | 700 | 215 | 221 | — | 455 | 270 |
| 27 | " | 10 | 0.028 | 283 | 956 | 4935 | 470 | 204 | 433 | 530 | 360 | 162 | 316 | 384 | 380 |
| 28 | " | 20 | 0.024 | 313 | 1132 | 3695 | 465 | 247 | 577 | 614 | 297 | 341 | — | 665 | 230 |
| 29 | HiFos | 5 | 0.007 | 353 | 1207 | 5163 | 485 | 285 | 783 | 923 | 370 | 243 | 576 | 669 | 385 |
| 30 | " | 10 | 0.009 | 344 | 1086 | 4664 | 470 | 248 | 554 | 595 | 325 | 151 | 296 | 330 | 340 |
| 31 | " | 20 | — | 451 | 1688 | 6006 | 470 | 447 | 1209 | 1282 | 320 | 367 | — | 888 | 275 |
| 32 | *120/30 | — | 0.22 | — | 1675 | 4775 | 475 | — | 390 | 675 | 490 | — | — | — | — |

*Sulfonate Control 120 meq. Zn Acetate, 30 meq. Stearic acid neutralized.

EXAMPLES 33-36

The following examples illustrate the use of a rosin salt plasticizer (Zirex) in comparison with zinc stearate plasticizer in highly extended compounds. A Sulfo EPDM gum was prepared in a procedure similar to Example 1. The formulations of Table XI were then prepared employing this gum which was designated 60/0 NPG. The formulations were prepared in a Brabender Plastograph and then sheeted out on a two roll mill. The resulting elastomeric materials were subsequently compression molded and tested using the pro-

TABLE XII
PHYSICAL PROPERTY MEASUREMENTS OF SULFO EPDM FORMULATIONS EMPLOYING ZINC STEARATE AND ZIREX AS PLASTICIZERS

| Property | Ex. 33 | Ex. 34 | Ex. 35 | Ex. 36 |
|---|---|---|---|---|
| Shore A Hardness | 70 | 73 | 68 | 65 |
| Tensile at 23° C | | | | |
| 100% Mod. psi | 490 | 495 | 365 | 340 |
| 300% Mod. psi | 1015 | 1020 | 910 | 810 |
| Tensile at break, psi | 1090 | 1110 | 985 | 1015 |
| Elong. at break, psi | 350 | 350 | 340 | 420 |
| Perm. set % | 19 | 25 | 6 | 13 |
| Tensile at 70° C | | | | |
| 100% Mod. psi | 220 | 190 | 125 | 115 |
| 300% Mod. psi | 365 | 330 | 225 | 215 |
| Tensile at break, psi | 450 | 450 | 310 | 305 |
| Elong. at break, % | 420 | 515 | 475 | 500 |
| Tensile at 100° C | | | | |
| 100% Mod. psi | 36 | 25 | 85 | 80 |
| 300% Mod. psi | 40 | 25 | 130 | 125 |
| Tensile at break, psi | 40 | 20 | 185 | 175 |
| Elong. at break, % | 1010 | 1000 | 630 | 580 |
| Rheology at 200° C | | | | |
| Viscosity at 0.73 sec$^{-1}$ | 28.0 | 14.0 | 45.2 | 33.4 |
| 7.3 sec$^{-1}$ | 7.4 | 4.4 | 11.4 | 8.9 |
| 73 sec$^{-1}$ | 1.7 | 1.2 | 2.7 | 2.2 |
| 291 sec$^{-1}$ | .71 | .50 | 1.0 | .90 |
| 728 sec$^{-1}$ | .40 | .27 | .54 | .46 |
| Melt Fracture, Shear Rate for onset, sec$^{-1}$ | 728 | None | 146 | 73 |

What is claimed is:

1. An elastomeric composition including
   (a) a neutralized sulfonated polymer having at least about 15 meq metal sulfonate groups per 100 grams of said sulfonated polymer; and
   (b) at least about 1 part by weight of a preferential plasticizer based on 100 parts of said neutralized sulfonated polymer, said preferential plasticizer being a metal rosin salt.

2. A composition according to claim 1, wherein said neutralized sulfonated polymer is formed from an elastomeric polymer selected from the group comprising Butyl rubber, and an EPDM terpolymer.

3. A composition according to claim 2, wherein said EPDM terpolymer consists essentially of about 40 to about 80 wt. % of ethylene, of about 10 to about 53 wt. % of propylene and of about 1 to about 10 wt. % of a non-conjugated diene.

4. A composition according to claim 3, wherein said non-conjugated diene is selected from the group consisting of 1,4-hexadiene, dicyclopentadiene, alkylidene substituted norbornenes, alkenyl substituted norbornenes, and tetrahydroindene.

5. A composition according to claim 4, wherein said non-conjugated diene is 5-ethylidene-2-norbornene.

6. A composition according to claim 1, wherein a concentration of said preferential plasticizer is about 1 to about 50 parts by weight per 100 of said metal neutralized sulfonated polymer.

7. A composition according to claim 1, wherein a metal cation of said metal sulfonate groups is selected from the group consisting of sodium, potassium, barium, magnesium, aluminum, calcium and zinc.

8. A composition according to claim 1, wherein a metal ion of said metal rosin salt is selected from the group consisting of Groups IA, IIA, IB and IIB of the Periodic Table of Elements.

9. A composition according to claim 1, wherein at least 90% of the cation contained in the said metal rosin salt is zinc.

10. A composition according to claim 1, further including a filler wherein said filler is selected from the group consisting of clay, talc, and calcium carbonate, and mixtures thereof.

11. A composition according to claim 10, further including a non-polar process oil, wherein said non-polar process oil is selected from the group consisting of paraffinics, naphthenics, and aromatics and mixtures thereof.

12. A composition according to claim 11, wherein said non-polar process oil is paraffinic having an $\overline{M}n$ of about 400 to about 1000.

13. A composition according to claim 11, further including a crystalline polyolefinic thermoplastic.

14. A composition according to claim 11, wherein said polyolefinic thermoplastic is added at a concentration level of less than about 100 parts per hundred.

15. A composition according to claim 14, wherein said polyolefinic thermoplastic has an $\overline{M}n$ of about at least 5000.

16. A composition according to claim 11, further including a metallic oxide at a concentration level of less than about 25 parts per hundred.

17. A composition according to claim 16, wherein said metal oxide is zinc oxide.

18. A composition of claim 11, further including a lubricant.

19. A composition of claim 18, wherein said lubricant is a crystalline hydrocarbon wax having a melting point of about 135° F. to about 220° F. and an $\overline{M}n$ of about 1000 to about 4000.

20. A composition according to claim 11, further including a reinforcing filler at a concentration level of about less than 50 parts per hundred.

21. A composition according to claim 11, further including an amorphous polypropylene.

22. A composition according to claim 1, wherein a concentration of said preferential plasticizer is about 3 to about 30 parts by weight per 100 parts of said metal neutralized sulfonated polymer.

23. A composition according to claim 1, wherein a concentration of said preferential plasticizer is about 5 to about 20 parts by weight per 100 parts of said metal neutralized sulfonated polymer.

* * * * *